(12) United States Patent
Sethi et al.

(10) Patent No.: US 11,893,376 B2
(45) Date of Patent: *Feb. 6, 2024

(54) METHOD AND SYSTEM FOR PERFORMING AN APPLICATION UPGRADE BASED ON USER BEHAVIOR

(71) Applicant: Dell Products L.P., Round Rock, TX (US)

(72) Inventors: Parminder Singh Sethi, Ludhiana (IN); Shelesh Chopra, Bangalore (IN); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 168 days.

This patent is subject to a terminal disclaimer.

(21) Appl. No.: 17/690,360

(22) Filed: Mar. 9, 2022

(65) Prior Publication Data

US 2023/0289168 A1  Sep. 14, 2023

(51) Int. Cl.
*G06F 8/65* (2018.01)

(52) U.S. Cl.
CPC .................................... *G06F 8/65* (2013.01)

(58) Field of Classification Search
CPC ......................................................... G06F 8/65
USPC ......................................................... 717/171
See application file for complete search history.

(56) References Cited

U.S. PATENT DOCUMENTS

| | | | | |
|---|---|---|---|---|
| 7,472,385 B2* | 12/2008 | Chamberlain | ............ | G06F 8/65 717/172 |
| 8,752,040 B2* | 6/2014 | Halliday | ............... | G06F 16/217 717/172 |
| 8,792,934 B2* | 7/2014 | Cupala | ................... | H04L 67/34 455/550.1 |
| 9,170,798 B2* | 10/2015 | Nagaraja | ............... | G06F 3/0486 |
| 10,372,434 B1* | 8/2019 | Michel | ...................... | G06F 8/65 |
| 10,372,595 B1* | 8/2019 | Chopra | ............... | G06F 11/3688 |
| 10,432,752 B2* | 10/2019 | Lee | ......................... | G06F 9/455 |
| 10,452,377 B2* | 10/2019 | Musani | ................ | G06F 11/362 |

(Continued)

FOREIGN PATENT DOCUMENTS

| | | | | |
|---|---|---|---|---|
| CN | 105634919 A | * | 6/2016 | |
| CN | 104951382 B | * | 12/2017 | |
| CN | 107291515 B | * | 9/2020 | ............... G06F 8/65 |
| CN | 116016174 A | * | 4/2023 | |

(Continued)

OTHER PUBLICATIONS

Foreign Patent Documents Text Translations for Documents (N-S).*

*Primary Examiner* — Francisco J Aponte
(74) *Attorney, Agent, or Firm* — Chamberlain, Hrdlicka, White, Williams & Aughtry; Aly Z. Dossa (57) ABSTRACT

A method for performing an application upgrade includes: performing an emulation to generate an application upgrade strategy for applying a plurality of application upgrades on a client device; determining a user behavior of a user of the client device; generating an application upgrade summary list using the application upgrade strategy and the user behavior; providing the application upgrade summary list to the user of the client device; and after the providing, initiating upgrading of the client device using a reordered application upgrade strategy generated in response to feedback from the user, in which the reordered application upgrade strategy is generated based on the application upgrade strategy and the user behavior.

15 Claims, 8 Drawing Sheets

(56) References Cited

U.S. PATENT DOCUMENTS

| | | | |
|---|---|---|---|
| 10,817,279 B1* | 10/2020 | Wang | H04L 67/34 |
| 10,936,293 B2* | 3/2021 | Varadharajan Kannan | G06F 8/71 |
| 11,010,148 B2* | 5/2021 | Dosho | G06F 8/61 |
| 11,341,233 B2* | 5/2022 | Shantharam | G06F 21/51 |
| 11,487,834 B1* | 11/2022 | Vadrevu | G06F 16/9535 |
| 2014/0195297 A1* | 7/2014 | Abuelsaad | G06Q 10/0635 |
| | | | 705/7.28 |
| 2015/0058734 A1* | 2/2015 | Ward | G06F 9/451 |
| | | | 715/731 |
| 2016/0239280 A1* | 8/2016 | Scheiner | G06F 8/60 |
| 2017/0097831 A1* | 4/2017 | Gopshtein | G06F 8/38 |
| 2020/0192651 A1* | 6/2020 | Mudumbai | H04L 41/14 |
| 2021/0019422 A1* | 1/2021 | Zan | G06F 21/577 |
| 2021/0157577 A1* | 5/2021 | Sobran | G06F 11/302 |
| 2022/0114594 A1* | 4/2022 | Nunes | G06Q 20/4016 |
| 2022/0156809 A1* | 5/2022 | Deng | G06F 9/5027 |
| 2023/0168877 A1* | 6/2023 | Sakuma | G06F 9/4401 |
| | | | 717/168 |
| 2023/0306170 A1* | 9/2023 | Fox | G06F 30/33 |
| | | | 726/22 |

FOREIGN PATENT DOCUMENTS

| | | | | |
|---|---|---|---|---|
| WO | WO-2019143412 A1 * | 7/2019 | | |
| WO | WO-2022081930 A1 * | 4/2022 | | G06Q 20/4016 |

* cited by examiner

METHOD AND SYSTEM FOR PERFORMING AN APPLICATION UPGRADE BASED ON USER BEHAVIOR

BACKGROUND

Computing devices in a system may include any number of internal components such as processors, memory, and persistent storage. The computing devices may execute applications (e.g., software). Each application may be upgraded to newer versions to protect the computing devices from security vulnerabilities of the application.

BRIEF DESCRIPTION OF DRAWINGS

Certain embodiments of the invention will be described with reference to the accompanying drawings. However, the accompanying drawings illustrate only certain aspects or implementations of one or more embodiments of the invention by way of example, and are not meant to limit the scope of the claims.

FIGS. 5.1 and 5.2 show a method to perform an application upgrade based on user behavior in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, when an application upgrade is to be performed, a user of a client device (e.g., a computing device) may defer the application upgrade because the user may be unaware about the impact(s) of the application upgrade to the computing device. Embodiments of the invention relate to methods and systems for performing an application upgrade based on user behavior. More specifically, various embodiments of the invention may receive information related to a plurality of application upgrades from an application monitoring agent. Based on the received information, a device emulation will be requested, and an emulation will be performed in response to generate an application upgrade strategy. An application upgrade summary list may then be generated using the application upgrade strategy. The user behavior will then be determined, and both the application upgrade summary list and the application upgrade strategy will be reordered based on the determined user behavior. Finally, the user of the client device will be notified about the reordered application upgrade summary list. In response to feedback from the user, the reordered application upgrade strategy will be initiated (e.g., instantiated, executed, etc.). This advantageously provides the user with a much clearer view about the application upgrade to be performed such that the user can be convinced not to defer the application upgrade.

The following describes various embodiments of the invention.

Figure 1:
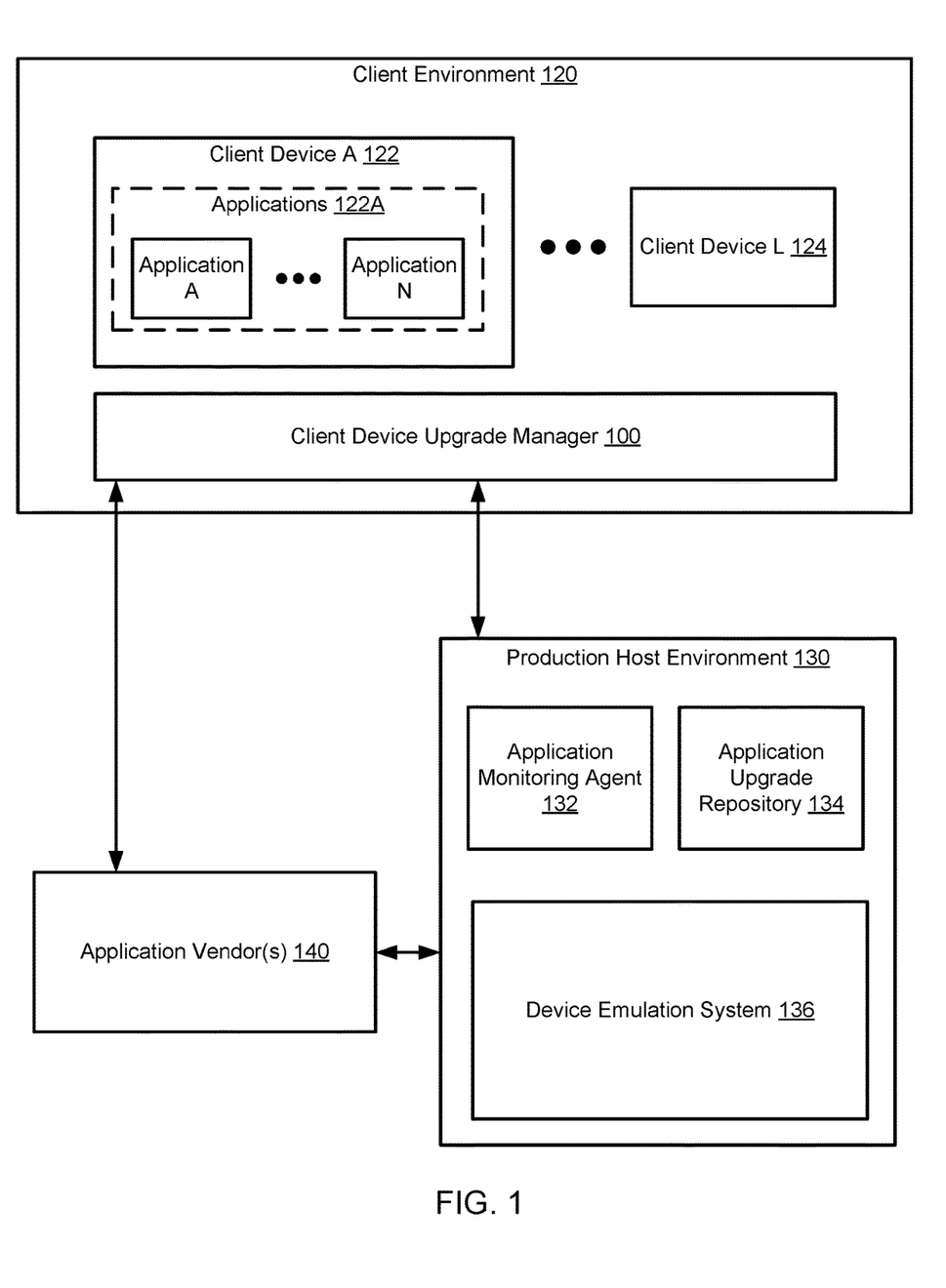
FIG. 1 shows a diagram of a system in accordance with one or more embodiments of the invention.

FIG. 1 shows a diagram of a system in accordance with one or more embodiments of the invention. The system includes a client environment (120), one or more application vendors (140), and a production host environment (130). The system may include additional, fewer, and/or different components without departing from scope of the invention. Each component may be operably connected to any of the other component via any combination of wired and/or wireless connections. Each component illustrated in FIG. 1 is discussed below.

In one or more embodiments of the invention, the client environment (120) may include client devices (client device A (122), client device L (124)) and a client device upgrade manager (100). The client devices (client device A (122), client device L (124)) and the client device upgrade manager (100) may be physical or logical devices, as discussed below.

In one or more embodiments of the invention, each client device (client device A (122), client device L (124)) may include one or more applications (122A). As shown in FIG. 1, the applications (122A) may include application A to application N. The applications (122A) may be logical entities executed using computing resources (not shown) of the client devices (client device A (122), client device L (124)). Each of the applications (122A) may perform similar or different processes. In one or more embodiments of the invention, the applications (122A) may provide services to users (e.g., clients (not shown)) of the client devices (client device A (122), client device L (124)). For example, the applications (122A) may host services and/or components. The services and/or components may be, for example but are not limited to: instances of databases, email servers, etc. The applications (122A) may host other types of services and/or components without departing from the scope of the invention.

Figure 7:
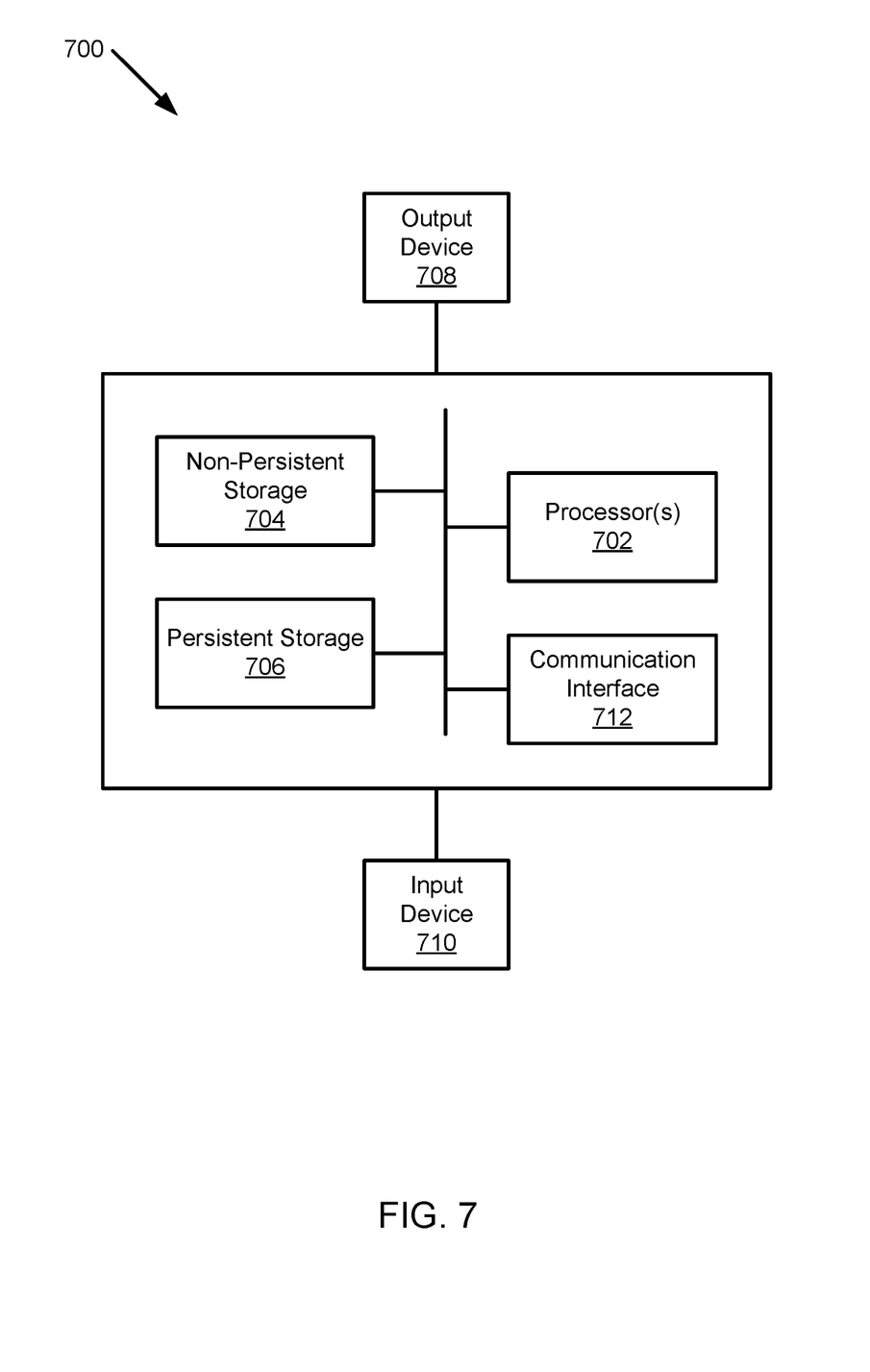
FIG. 7 shows a diagram of a computing device in accordance with one or more embodiments of the invention.

In one or more embodiments of the invention, each client device (client device A (122), client device L (124)) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of each client device (client device A (122), client device L (124)) described throughout this application.

Alternatively, in one or more embodiments of the invention, each client device (client device A (122), client device L (124)) may be implemented as a logical device. The logical device may utilize the computing resources of any number of computing devices to provide the functionality of each client device (client device A (122), client device L (124)) described throughout this application.

In one or more embodiments of the invention, the applications (122A) may be upgraded based on newer versions available for installation. The installation of application upgrades may be performed and/or otherwise initiated by the client device upgrade manager (100). The client device upgrade manager (100) may also periodically collect information (e.g., client device state and configuration information) from the client devices (client device A (122), client device L (124)).

In one or more embodiments of the invention, the applications (122A) may be implemented as computer instructions, e.g., computer code, stored on a persistent storage that when executed by a processor(s) of a computing device cause the computing device (e.g., 700, FIG. 7) to provide the functionality of the applications (122A) described throughout this application.

In one or more embodiments of the invention, the client device upgrade manager (100) may then send this information to the application vendor(s) (140) for technical support (e.g., recommendations and/or fixes for hardware and/or software failures) to the client devices (client device A (122), client device L (124)). The client device upgrade manager (100) may also identify the client devices (client device A (122), client device L (124)) that require an application upgrade. The application vendor(s) (140) may then provide one or more catalog files (described in more detail below) that specify the requirements of the identified client devices (client device A (122), client device L (124)) to the production host environment (130).

In one or more embodiments of the invention, the client device upgrade manager (100) may obtain the estimated time that one or more application upgrades may take. The client device upgrade manager (100) may obtain the application upgrade time estimation from the production host environment (130). The client device upgrade manager (100) may then provide the application upgrade time estimation and optimal time slots in which the application upgrade may be performed to the identified client devices (client device A (122), client device L (124)).

In one or more embodiments of the invention, the client device upgrade manager (100) may further include functionality of monitoring device configuration information of the client devices (client device A (122), client device L (124)). The device configuration information of the client devices (client device A (122), client device L (124)) may include, but it is not limited to: operating system information of a client device, the number of applications already installed to a client device, current versions of such applications already installed to a client device, processing power of a client device, etc. The device configuration information of the client devices (client device A (122), client device L (124)) may be provided to the production host environment (130).

The device configuration information of the client devices (client device A (122), client device L (124)) may also include other details without departing from the scope of the invention.

In one or more embodiments of the invention, the client device upgrade manager (100) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device upgrade manager (100) described throughout this application.

Alternatively, in one or more embodiments of the invention, similar to the client devices (client device A (122), client device L (124)), the client device upgrade manager (100) may also be implemented as a logical device, as discussed above.

Turning back to the production host environment (130), in one or more embodiments of the invention, the production host environment (130) may include an application monitoring agent (132), an application upgrade repository (134), and a device emulation system (136). The production host environment (130) may include additional, fewer, and/or different components without departing from the scope of the invention.

In one or more embodiments of the invention, the production host environment (130) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

Alternatively, in one or more embodiments of the invention, similar to the client devices (client device A (122), client device L (124)), the production host environment (130) may also be implemented as a logical device, as discussed above.

In one or more embodiments of the invention, the application upgrade repository (134) may store versions of the application upgrade(s). The application upgrade repository (134) may be updated by the application vendor(s) (140) based on newer versions of the application upgrade(s) being available. The application upgrade repository (134) may further store catalog files related to the application upgrade(s) to be installed. The catalog files may include, for example, but are not limited to: a compatible device model, a minimum application version for the application upgrade to be installed, a compatible operating system (and corresponding version of such operating system), an upgrade sequence, etc.

In one or more embodiments of the invention, the application monitoring agent (132) may push the application upgrade(s) to the client device upgrade manager (100). The application monitoring agent (132) may also obtain a list of the client devices (client device A (122), client device L (124)) that are managed by the client device upgrade manager (100). The application monitoring agent (132) may further obtain the information related to the application(s) already installed to those client devices (client device A (122), client device L (124)) from the client device upgrade manager (100).

In one or more embodiments of the invention, the application monitoring agent (132) may monitor the application upgrade repository (134) to identify the application upgrade(s) available in the application upgrade repository (134). The application monitoring agent (132) may then identify one or more client devices (client device A (122), client device L (124)) that are compatible with the application upgrade based on the catalog files related to the application upgrade in the application upgrade repository (134).

In one or more embodiments of the invention, in response to an emulated application upgrade (e.g., an emulation of an application upgrade that is to be performed on an emulated client device (e.g., device A emulation (224)), described below in reference to FIG. 2)), the application monitoring agent (132) may initiate an estimation of performing the application upgrade on one or more of the client devices (client device A (122), client device L (124)). The application upgrade estimation(s) may then be provided to the client device upgrade manager (100).

In one or more embodiments of the invention, the application monitoring agent (132) may further send information related to the application upgrade to a device emulation orchestration engine (e.g., 210, FIG. 2), which is part of the device emulation system (136). In one or more embodiments of the invention, the information related to the application upgrade may include, but it is not limited to: application version of an application upgrade, supported operating system version(s) for an application upgrade, etc. The information related to the application upgrade may also include other details without departing from the scope of the invention.

In one or more embodiments of the invention, the application monitoring agent (132) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the application monitoring agent (132) described throughout this application.

Alternatively, in one or more embodiments of the invention, similar to the client devices (client device A (122), client device L (124)), the application monitoring agent (132) may also be implemented as a logical device, as discussed above.

In one or more embodiments of the invention, the device emulation system (136) may be a system of device emulation containers (e.g., device emulation container A (220), device emulation container L (230), described below in reference to FIG. 2) that may be configured to emulate the client devices (client device A (122), client device L (124)). The emulation of the client devices (client device A (122), client device L (124)) may be used for applying the application upgrade to the emulated devices and measuring application upgrade metrics.

In one or more embodiments of the invention, the application upgrade metrics may include, but they are not limited to: the time taken to complete the application upgrade, the number of reboots required after performing the application upgrade, etc. The application upgrade metrics may also include other details not listed above without departing from the scope of the invention. Additional details regarding the device emulation system (136) are described below in reference to FIG. 2.

In one or more embodiments of the invention, the device emulation system (136) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation system (136) described throughout this application.

Alternatively, in one or more embodiments of the invention, similar to the client devices (client device A (122), client device L (124)), the device emulation system (136) may also be implemented as a logical device, as discussed above.

Figure 2:
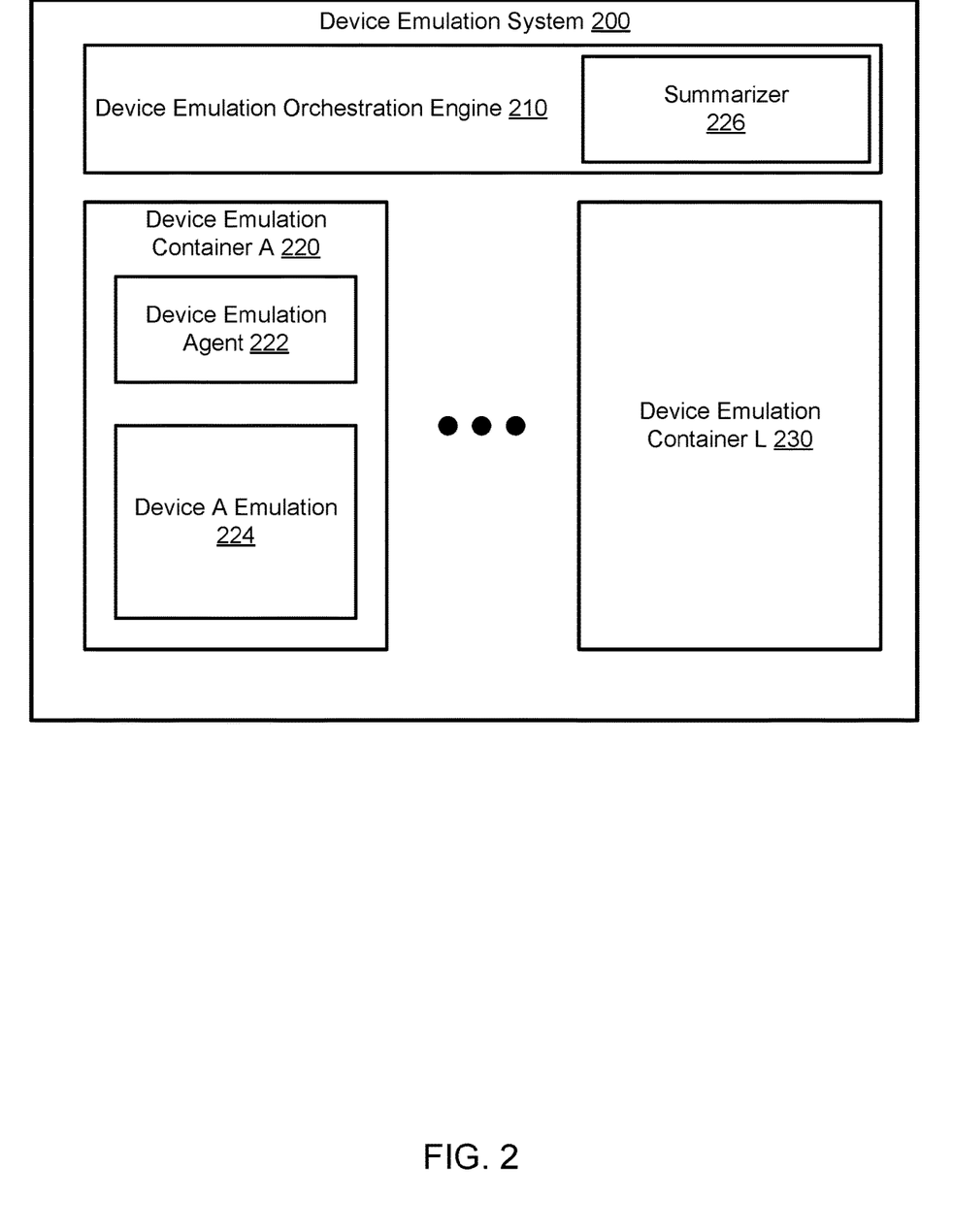
FIG. 2 shows a diagram of a device emulation system in accordance with one or more embodiments of the invention.

Turning now to FIG. 2, FIG. 2 shows a diagram of a device emulation system in accordance with one or more embodiments of the invention. The device emulation system (200) may be an example of the device emulation system (e.g., 136, FIG. 1) discussed above, in which the device emulation system (e.g., 136, FIG. 1) emulates the client devices (e.g., client device A (122), client device L (124), FIG. 1). The device emulation system (200) may include the device emulation orchestration engine (210), one or more device emulation containers (device emulation container A (220), device emulation container L (230)), and a summarizer (226). The device emulation system (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments of the invention, the device emulation orchestration engine (210) orchestrates the generation of the device emulation containers (device emulation container A (220), device emulation container L (230)). For example, the device emulation orchestration engine (210) may receive request(s) from the application monitoring agent (e.g., 132, FIG. 1) to emulate an application upgrade on an emulated client device (e.g., device A emulation (224)). The device emulation orchestration engine (210) may then initiate the emulation of the client devices (e.g., client device A (122), client device L (124), FIG. 1) and the application upgrade.

In one or more embodiments of the invention, the device emulation orchestration engine (210) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation orchestration engine (210) described throughout this application.

Alternatively, in one or more embodiments of the invention, similar to the client devices (e.g., client device A (122), client device L (124), FIG. 1), the device emulation orchestration engine (210) may also be implemented as a logical device, as discussed above.

Continuing the discussion of FIG. 2, in one or more embodiments of the invention, the device emulation containers (device emulation container A (220), device emulation container L (230)) may include a device emulation agent (222) that monitors the application upgrade(s) executing on the emulated client device (device A emulation (224)). More specifically, the device emulation agent (222) may monitor, for example, the application upgrade(s) performed on the emulated client device (device A emulation (224)) to measure the time taken to perform each application upgrade and to track the number of reboots performed after each application upgrade.

In one or more embodiments of the invention, the monitored parameters may then be used to evaluate the application upgrade(s) and, based on this evaluation, to determine whether the application upgrade(s) should be pushed out to the client device (e.g., client device A (122), client device L (124), FIG. 1).

In one or more embodiments of the invention, the device emulation agent (222) may perform an emulation to generate an application upgrade strategy (see, e.g., FIG. 3) for the emulated client device (device A emulation (224)). In one or more embodiments of the invention, the application upgrade strategy may be generated based on the available application upgrades for the client device (e.g., client device A (122), client device L (124), FIG. 1) in the application upgrade repository (e.g., 134, FIG. 1). The device emulation agent (222) may then send the application upgrade strategy to the summarizer (226).

In one or more embodiments of the invention, the application upgrade strategy may be generated in an iterative manner. For example, multiple application upgrade strategies may be evaluated to find the most efficient application upgrade strategy for performing the application upgrades on the emulated client device (device A emulation (224)). For this purpose, hardware capabilities of the emulated client device (device A emulation (224)), including, but not limited to, storage capability of the random access memory, processing power of one or more processors may be taken into account while generating the application upgrade strategies. Other hardware capabilities of the emulated client device (device A emulation (224)) not listed above may also be taken into account without departing from the scope of the invention. Additional details regarding the application upgrade strategy are described below in reference to FIG. 3.

In one or more embodiments of the invention, upon receiving the application upgrade strategy, the summarizer (226) may generate an application upgrade summary list using the application upgrade strategy. In one or more embodiments of the invention, the application upgrade summary list may include, but it is not limited to: an application identifier of an application executing on the client device (e.g., client device A (122), client device L (124), FIG. 1), an identifier of an application upgrade for the application, a duration of time to complete the application upgrade on the client device (e.g., client device A (122), client device L (124), FIG. 1), etc. The application upgrade summary list may also include other details not listed above without departing from the scope of the invention.

In one or more embodiments of the invention, the summarizer (226) may include one or more details of each application upgrade listed in the application upgrade summary list. For example, the summarizer (226) may include a detail related to a security feature specific to an application for protecting the client device (e.g., client device A (122), client device L (124), FIG. 1) from phishing attack(s). Before performing the application upgrade, the user of the client device (e.g., client device A (122), client device L (124), FIG. 1) may be notified about the detail(s) related to the security feature.

In one or more embodiments of the invention, the summarizer (226) may also determine user behavior (e.g., behavior of the user of the client device) using information specified in application logs and system logs. In one or more embodiments of the invention, the application logs may include, for example: information related to task scheduler history, information related to domain name system (DNS) change, etc. The application logs are not limited to these information and may also include other details not listed above without departing from the scope of the invention.

Further, in one or more embodiments of the invention, the system logs may include, for example: information related to central processing unit (CPU) usage, information related to a newly detected universal serial bus (USB) device, etc. The system logs are not limited to these information and may also include other details not listed above without departing from the scope of the invention.

Figure 4:
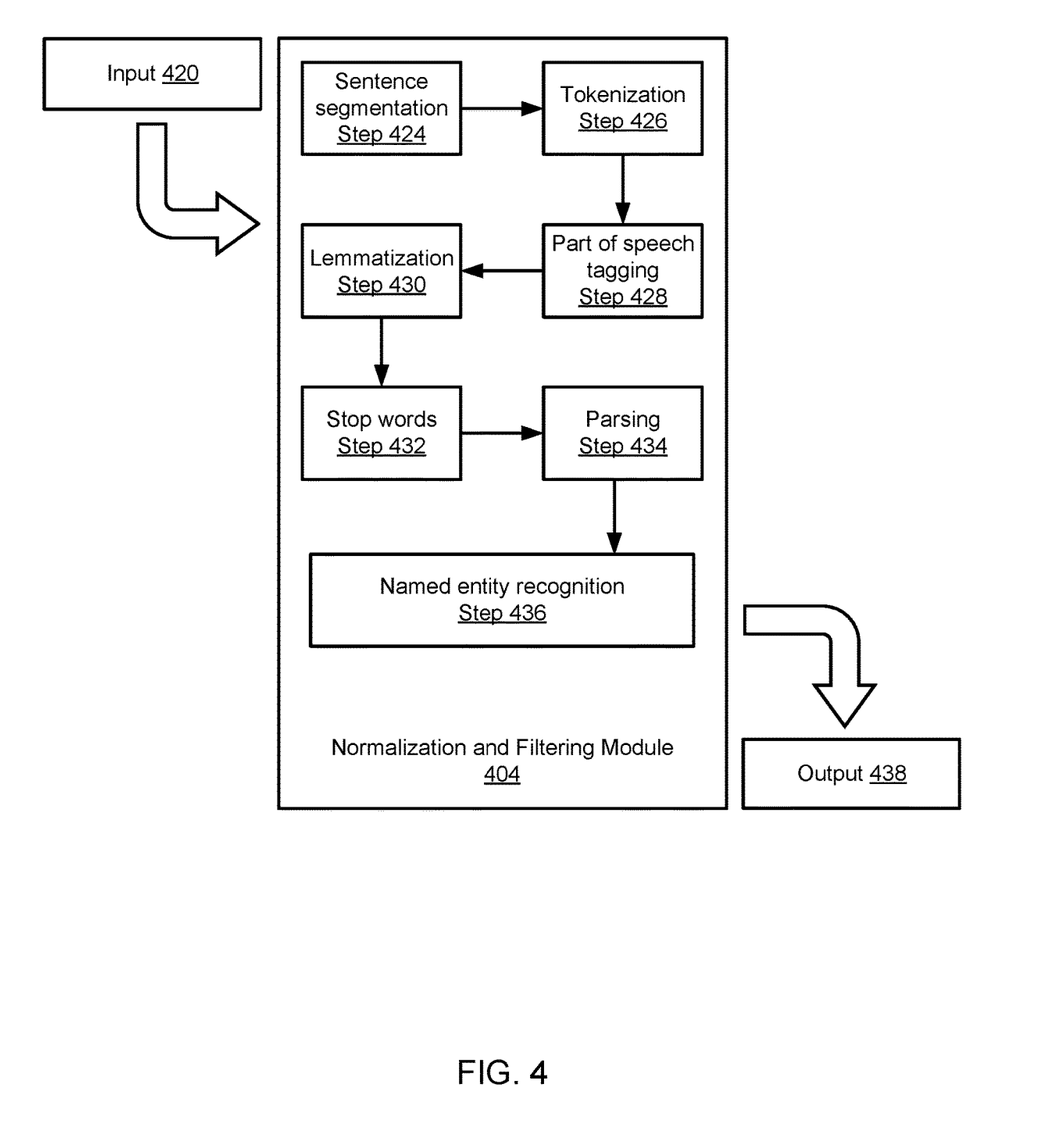
FIG. 4 shows a diagram of a normalization and filtering module and a flowchart about the operation of the normalization and filtering module in accordance with one or more embodiments of the invention.

In one or more embodiments of the invention, to determine the user behavior, the summarizer (226) may include a normalization and filtering module (see, e.g., FIG. 4). In one or more embodiments of the invention, the normalization and filtering module may be implemented using hardware, software, or any combination thereof. Additional details regarding the normalization and filtering module are described below in reference to FIG. 4.

Figure 3:
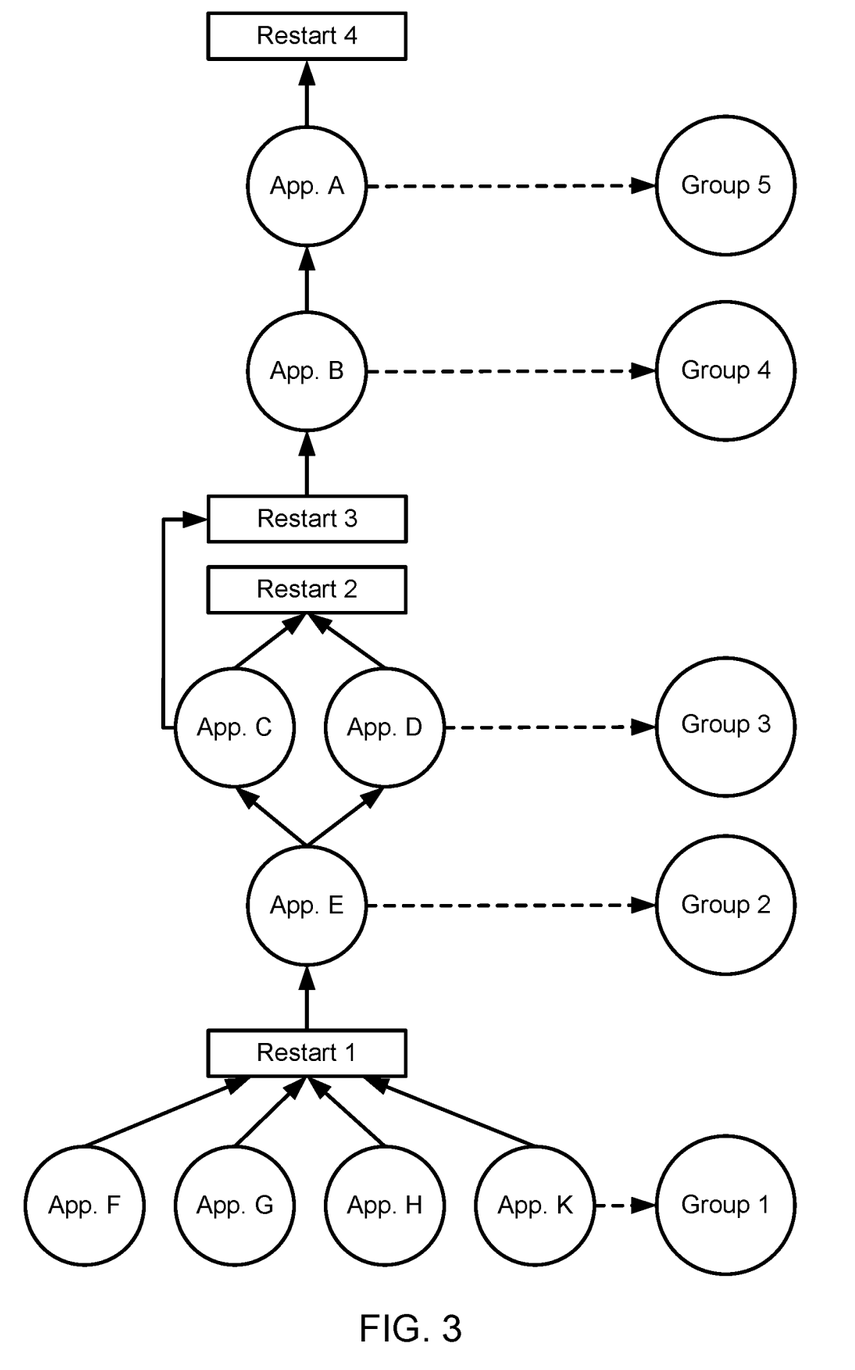
FIG. 3 shows an application upgrade strategy in accordance with one or more embodiments of the invention.

Turning now to FIG. 3, FIG. 3 shows an application upgrade strategy in accordance with one or more embodiments of the invention. In one or more embodiments of the invention, the application upgrade strategy may include one or more application upgrades to be performed (e.g., application upgrade A (App. A), App. C, App. F, etc.). The application upgrade strategy may also include one or more restarts (e.g., Restart 1, Restart 2, Restart 3, etc.) to be performed on one or more of the client devices (e.g., client device A (122), client device L (124), FIG. 1) such that the effect(s) of completed application upgrades can be applied to the client devices.

In one or more embodiments of the invention, related ones of the application upgrades (e.g., App. F, App. G, App. H, App. K) (also referred to herein as "related application upgrades") for a client device may be classified and named as a group of application upgrades (e.g., Group 1). In this manner, a restart (e.g., Restart 1) may be performed to apply the effect(s) of the group of application upgrades (e.g., Group 1) to the client device. Additionally, a restart (e.g., Restart 3) may also be performed to apply the effect(s) of an individual application upgrade (e.g., App. C) to a client device.

In one or more embodiments of the invention, the related application upgrades may be classified based on, for example, their names and/or their types (e.g., corrective application upgrade, functional application upgrade). The related application upgrades may also be classified based on other parameters not listed above without departing from the scope of the invention.

Turning now to FIG. 4, in accordance with one or more embodiments of the invention, FIG. 4 shows a diagram of a normalization and filtering module and a flowchart describing the operation of the normalization and filtering module. For the sake of brevity, not all components (e.g., a stemming process to reduce a word to its stem by minimizing inflection in the word) of the normalization and filtering module may be illustrated in FIG. 4. In one or more embodiments of the invention, the normalization and filtering module (404) may obtain application logs and system logs of a client device (e.g., client device A (122), client device L (124), FIG. 1) as an input (420). The operation of the normalization and filtering module (404) is explained below.

In Step 424, the input (e.g., Washington, D.C., is the capital of the United States of America. It is also home to iconic museums.) is broken into separate sentences (e.g., Washington, D.C., is the capital of the United States of America.).

In Step 426, tokenization (e.g., splitting a sentence into smaller portions, such as individual words and/or terms) of important elements of a targeted sentence and the extraction of a token (i.e., keyword) based on the identified group of words occurs. For example, based on Step 424, the input is breaking into the smaller portions as "Washington", "D", ".", "C", ".", ",", "is" "the", "capital" "of" "the", "United", "States", "of", "America", ".".

In Step 428, a part of speech (e.g., noun, adjective, verb, etc.) of each token will be determined. In one or more embodiments of the invention, understanding the part of speech of each token will be helpful to figure out the details of the sentence. In one or more embodiments of the invention, in order to perform the part of speech tagging, for example, a pre-trained part of the speech classification model can be implemented. The pre-trained part of speech classification model attempts to determine the part of speech of each token based on similar words identified before. For example, the pre-trained part of speech classification model may consider "Washington" as a noun and "is" as a verb.

In Step 430, a lemmatization (i.e., identifying the most basic form of each word in a sentence) of each token is performed. In one or more embodiments of the invention, each token may appear in different forms (e.g., capital, capitals, etc.). With the help of lemmatization, the pre-trained part of speech classification model will understand that "capital" and "capitals" are originated from the same word. In one or more embodiments of the invention, lemmatization may be implemented according to a look-up table of lemma forms of words based on their part of speech.

Those skilled in the art will appreciate that while the example discussed in Step 430 considers "capital" and "capitals" to implement the lemmatization, any other word may also be used to implement the lemmatization without departing from the scope of the invention.

In Step 432, some of the words in the input (e.g., Washington, D.C., is the capital of the United States of America.) will be flagged and filtered before performing a statistical analysis. In one or more embodiments of the invention, some words (e.g., "a", "the", "and", etc.) may appear more frequently than other words in the input and while performing the statistical analysis, they may create a noise. In one or more embodiments of the invention, these words will be tagged as stop words and they may identified based on a list of known stop words.

Those skilled in the art will appreciate that while the example discussed in Step 432 uses "a", "the", "and" as the stop words, any other stop word may be considered to perform flag and filter operation in the statistical analysis without departing from the invention.

Continuing the discussion of FIG. 4, in Step 434, a process of determining the syntactic structure of a sentence (i.e., a parsing process) is performed. In one or more embodiments of the invention, the parsing process may determine how all the words in a sentence relate to each other by creating a parse tree. The parse tree assigns a single parent word to each word in the sentence, in which the root of the parse tree will be the main verb in the sentence. In addition to assigning the single parent word to each word, the parsing process can also determine the type of relationship between those two words. For example, in the following sentence, "Washington, D.C., is the capital of the United States of America", the parse tree shows "Washington" as the noun and it has a "be" relationship with "capital".

In Step 436, in response to the parsing process, a named entity recognition process is performed. In one or more embodiments of the invention, some of the nouns in the input (e.g., Washington, D.C., is the capital of the United States of America.) may present real things. For example, "Washington" and "America" represent physical places. In this manner, a list of real things included in the input may be detected and extracted. In one or more embodiments of the invention, to do that, the named entity recognition process applies a statistical analysis such that it can distinguish "George Washington", the person, and "Washington", the place, using context clues.

Those skilled in the art will appreciate that while the example discussed in Step 436 uses physical location as a context clue for the named entity recognition process, any other context clues (e.g., names of events, product names, dates and times, etc.) may also be considered to perform the named entity recognition process without departing from the scope of the invention.

In response to Step 436, a targeted feature (e.g., a keyword) in the input (420) will be extracted as an output (438). In one or more embodiments of the invention, the keyword may be the name of a specific application that is already installed on the client device. The keyword may then be stored in a storage (not shown) of the client device.

Figure 51:
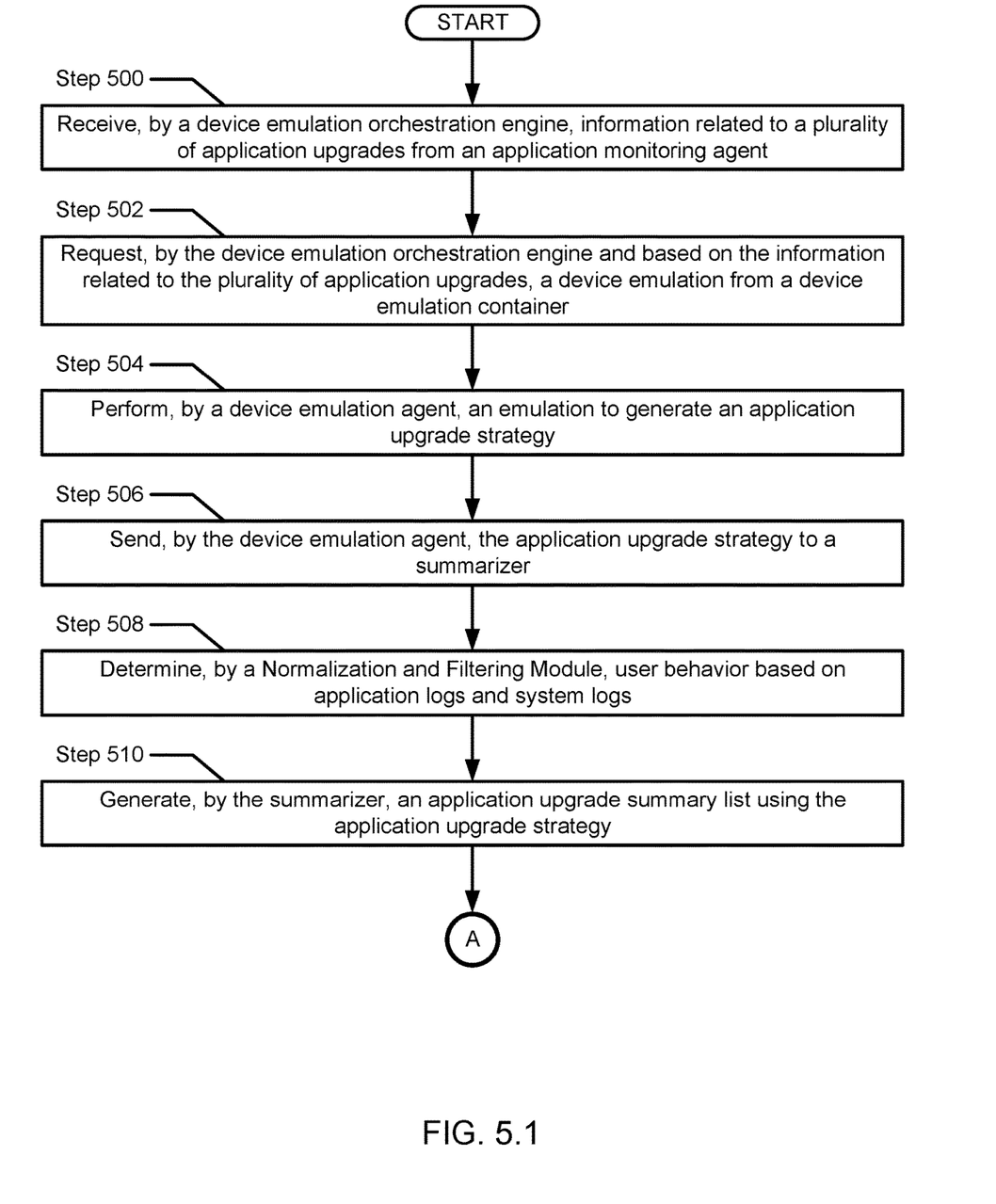
Figure 52:
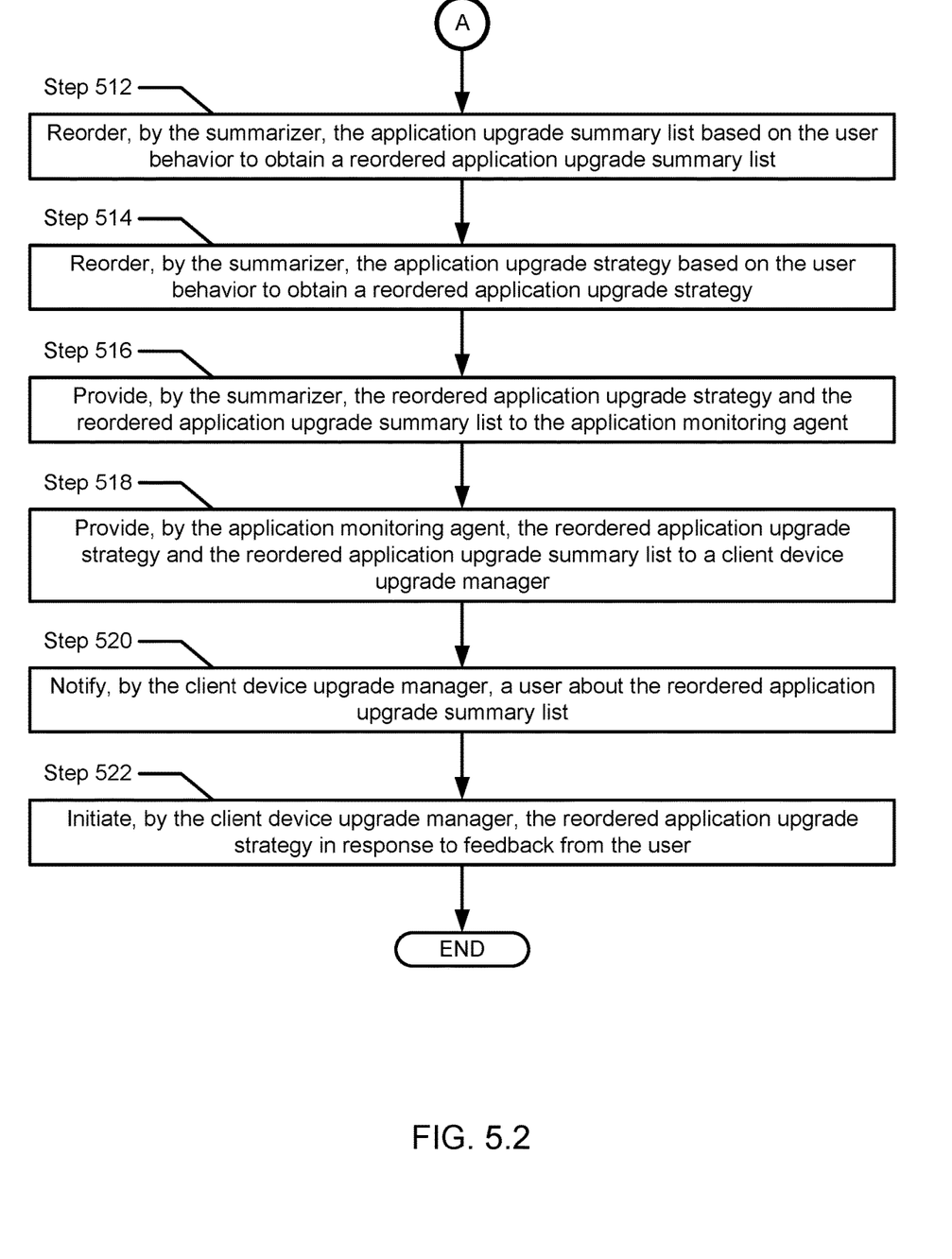

In one or more embodiments of the invention, the user behavior may be determined using the extracted keywords making up the output (438). For example, a term frequency of the keyword specifying an importance and/or a frequency of appearance of the keyword in the input (420) may be determined using a term frequency-inverse document frequency (TF-IDF) method. In one or more embodiments of the invention, the TF-IDF method may statistically measure the term frequency of a given term (e.g., the keyword) in a collection of documents (e.g., the input (420)). Additional details regarding user behavior determination are described below in reference to FIGS. 5.1 and 5.2.

FIGS. 5.1 and 5.2 show a method to perform an application upgrade based on user behavior in accordance with one or more embodiments of the invention. While the various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 5.1, the method shown in FIG. 5.1 may be performed by, for example, the application monitoring agent (e.g., 132, FIG. 1), the device emulation orchestration engine (e.g., 210, FIG. 2), the device emulation container (e.g., device emulation container A (220), device emulation container L (230)), the device emulation agent (e.g., 222, FIG. 2), and the summarizer (e.g., 226, FIG. 2). Other components of the system illustrated in FIG. 1 may also contribute to the performance of the method shown in FIG. 5.1 without departing from the scope of the invention.

In Step 500, information related to a plurality of application upgrades from an application monitoring agent is received. In one or more embodiments of the invention, the information related to the plurality of application upgrades may be received by the device emulation orchestration engine.

In one or more embodiments of the invention, prior to sending the information related to the plurality of application upgrades to the device emulation orchestration engine, the application monitoring agent may have received this information from the application upgrade repository (e.g., 134, FIG. 1). Additionally, the device configuration information of the client device that is to be upgraded using the plurality of application upgrades (e.g., a client device that requested the plurality of application upgrades) may be obtained prior to receiving the information related to the plurality of application upgrades.

In one or more embodiments of the invention, the information related to the plurality of application upgrades may include, but it is not limited to: application version information of each application upgrade, computing device information of the client device, etc. The information related to the plurality of application upgrades may also include other details not listed above without departing from the scope of the invention.

In one or more embodiments of the invention, the device configuration information of the client device may specify the configuration of the client device that requested the plurality of application upgrades. The configuration of the client device may include, for example: a current version of the operating system of the client device, the amount of memory available for the client device, a number of applications executing on the client device, the amount of available persistent storage of the client device, etc. Other types of client device configurations not listed above may also be specified in the device configuration information without departing from the scope of the invention.

In Step 502, a device emulation is requested from the device emulation container. In one or more embodiments of the invention, based on the information related to the plurality of application upgrades, the device emulation may be requested by the device emulation orchestration engine.

In one or more embodiments of the invention, the device emulation request may specify applying the plurality of application upgrades to an emulated device of a corresponding client device. The device emulation request may also specify monitoring the installation of the plurality of application upgrades to obtain the application upgrade metrics. Other tasks not listed above may also be specified in the device emulation request without departing from the scope of the invention. Additional details regarding the application upgrade metrics are described above in reference to FIG. 1.

In one or more embodiments of the invention, while performing the device emulation of the corresponding client device, a set of upgrade estimations for each application upgrade may be obtained from the device emulation agent. The set of upgrade estimations may specify, for example, an estimated completion time for each application upgrade to be applied to the client device. In one or more embodiments of the invention, the set of upgrade estimations may further specify the number of reboots required after all application upgrades have been applied. Other parameters not listed above may also be specified by the set of upgrade estimations without departing from the scope of the invention. The set of upgrade estimations may then be provided to the device emulation orchestration engine.

In Step 504, an emulation to generate the application upgrade strategy is performed. In one or more embodiments of the invention, the emulation to generate the application upgrade strategy may be performed by the device emulation agent. During the generation of the application upgrade strategy, the set of upgrade estimations and the application upgrade metrics may be considered. Details regarding the application upgrade strategy are described above in reference to FIG. 3.

Continuing the discussion of FIG. 5.1, in Step 506, the application upgrade strategy is sent to the summarizer. In one or more embodiments of the invention, the application upgrade strategy may be sent by the device emulation agent.

In Step 508, user behavior is determined based on the application logs and system logs. In one or more embodiments of the invention, the user behavior may be determined using the normalization and filtering module. Details regarding the normalization and filtering module are described above in reference to FIG. 4.

In one or more embodiments of the invention, the summarizer may determine an order to arrange the application upgrade summary list and the application upgrade strategy based on the user behavior. The order may be determined by applying the TF-IDF method to log files (e.g., application logs, system logs) associated with applications executing on the client device. In one or more embodiments of the invention, the summarizer may use the output of the normalization and filtering module (e.g., 438, FIG. 4) as an input of the TF-IDF method.

As a statistical measure tool in text processing, the TF-IDF method specifies the importance and commonality of a targeted term in a collection of documents by multiplying the TF of the targeted term by the IDF of the targeted term (described in more detail in the next paragraph). More specifically, the TF of the targeted term may be defined as TF(t, d), in which TF(t, d) specifies the number of times the targeted term "t" appeared in "d" (i.e., the number of documents in one or more collection of documents). For example, assume that the targeted term in the collection of documents is "plugin" and the targeted term has 10 occurrences in the collection of documents. Assuming that the total number of terms in the collection of documents is 1000, then the TF of "plugin" will be 0.01. However, using the TF alone to measure importance or commonality of the term "plugin" in the collection of documents is not sufficient. For example, certain terms (e.g., "the", "a", "and", etc.) may occur a lot in the collection of documents and those certain terms may have a higher TF than the TF of the term "plugin". To overcome this issue, an IDF of the term "plugin" should be multiplied by the TF of the term "plugin".

The IDF is a function of both the targeted term and the collection of documents (i.e., IDF(t, d)), in which the IDF(t, d) may be written as "log(the number of documents in the collection of documents/the number of documents that includes the targeted term)". Assuming that one of the certain terms mentioned above (i.e., "the") appears in all of the collection of documents (e.g., three documents in total). Then, the IDF(t, d) of "the" will be equal to zero, because log(3/3) is equal to zero. Additionally, assuming that the term "plugin" only appeared in one of the three documents. Then, the IDF(t, d) of the term "plugin" will be equal to log(3). In this manner, the TD-IDF of the term "plugin" will be equal to (0.01)×log(3).

In Step 510, an application upgrade summary list is generated using the application upgrade strategy. In one or more embodiments of the invention, the application upgrade summary list may be generated by the summarizer. Details regarding the application upgrade summary list are described above in reference to FIG. 2.

Turning now to FIG. 5.2, the method shown in FIG. 5.2 may be performed by, for example, the application monitoring agent (e.g., 132, FIG. 1), the client device upgrade manager (e.g., 100, FIG. 1), and the summarizer (e.g., 226, FIG. 2). Other components of the system illustrated in FIG. 1 may also contribute to the performance of the method shown in FIG. 5.2 without departing from the scope of the invention.

In Step 512, the application upgrade summary list is reordered based on the user behavior to obtain a reordered application upgrade summary list. In one or more embodiments of the invention, the application upgrade summary list may be reordered by the summarizer.

In one or more embodiments, assume for example that the resulting TF-IDF value of a first targeted term (i.e., name of App. E) is 0.05, a second targeted term (i.e., name of App. G) is 0.02, and a third targeted term (i.e., name of App. B) is 0.04. In one or more embodiments of the invention, a TF-IDF value will be high if a targeted term is more relevant in the application logs and system logs (i.e., used more by the user of the client device) than other targeted terms. Consistently, the TF-IDF values in the example above indicate that App. E having the highest TF-IDF value is used more by the user of the client device (e.g., is more relevant to the user than App. G and App. B).

In one or more embodiments of the invention, additionally, a plurality of application upgrade entries (e.g., the number of reboots after performing the application upgrade, purpose of the application upgrade, etc.) of the application upgrade summary list will be arranged in an order reflecting the user behavior. Continuing the above-discussed example in the previous paragraph, the application upgrade entry corresponding to the App. E will be the highest ordered entry in the reordered application upgrade summary list.

In one or more embodiments of the invention, the application upgrade entries corresponding to the application upgrades that are dependent to App. E (e.g., App. C, App. D) will be prioritized in the reordered application upgrade summary list. For example, regardless of their TF-IDF values, the application upgrade entries of App. C and App. D will be listed above the application upgrade entries of App. B and App. G in the reordered application upgrade summary list.

In Step 514, the application upgrade strategy is reordered based on the user behavior to obtain a reordered application upgrade strategy. In one or more embodiments of the invention, the application upgrade strategy may be reordered by the summarizer.

In one or more embodiments of the invention, in view of the example in Step 512, the application upgrade strategy will be reordered in a way to reflect the user behavior, in which App. E will be the highest priority application upgrade in the application upgrade strategy (see, e.g., FIG. 6). In one or more embodiments of the invention, the application upgrades that are dependent on App. E (e.g., App. C, App. D) will also be prioritized in the reordered application upgrade strategy. For example, regardless of their TF-IDF values, App. C and App. D will be listed above App. B and App. G in the reordered application upgrade strategy.

In Step 516, the reordered application upgrade strategy and the reordered application upgrade summary list are provided to the application monitoring agent. In one or more embodiments of the invention, the reordered application upgrade strategy and the reordered application upgrade summary list may be provided by the summarizer.

In Step 518, the reordered application upgrade strategy and the reordered application upgrade summary list are provided to the client device upgrade manager. In one or more embodiments of the invention, the reordered application upgrade strategy and the reordered application upgrade summary list may be provided by the application monitoring agent.

In Step 520, the user is notified about the reordered application upgrade summary list. In one or more embodiments of the invention, the user may be notified by the client device upgrade manager.

In one or more embodiments of the invention, the reordered application upgrade summary list may be displayed to the user on a graphical user interface (GUI). In one or more embodiments of the invention, the reordered application upgrade summary list may be displayed on a display of a display engine (not shown), in which the display engine is operatively connected to the computing device (e.g., 700, FIG. 7). The display engine may be implemented using hardware, software, or any combination thereof.

In one or more embodiments disclosed herein, the display engine may cause the display to show the reordered application upgrade summary list to the user. The reordered application upgrade summary list may be displayed in any visual format which would allow the user to easily read and parse through all of the listed information.

In one or more embodiments of the invention, the display engine may receive the output generated by the client device upgrade manager and the display engine may have aggregated these outputs into a user-friendly display format (e.g., an application including subtabs for each of the application upgrade entry listed in the reordered application summary list). The output may include, but it is not limited to: the number of application upgrades, the number of reboots after performing the application upgrades, time duration of each application upgrade, the names of each application upgrade, purpose of each application upgrade, etc. The output may also include other details not listed above without departing from the scope of the invention.

In Step 522, in response to feedback from the user, the reordered application upgrade strategy may be initiated. In one or more embodiments of the invention, the reordered application upgrade may be initiated by the client device upgrade manager. For example, based on the reordered application upgrade strategy, as the first item, the performance of App. E may be implemented.

In one or more embodiments of the invention, the method ends following Step 522.

The embodiments shown in FIGS. 5.1 and 5.2 enable the user to perform a plurality of application upgrades by ensuring the user of the impact(s) of the plurality of application upgrades. For this purpose, before notifying the user about the plurality application upgrades, the application that is used the most by the user is determined. Then, the application upgrade corresponding to the most used application is prioritized in an application upgrade strategy such that the user can be convinced not to defer the application upgrade.

Figure 6:
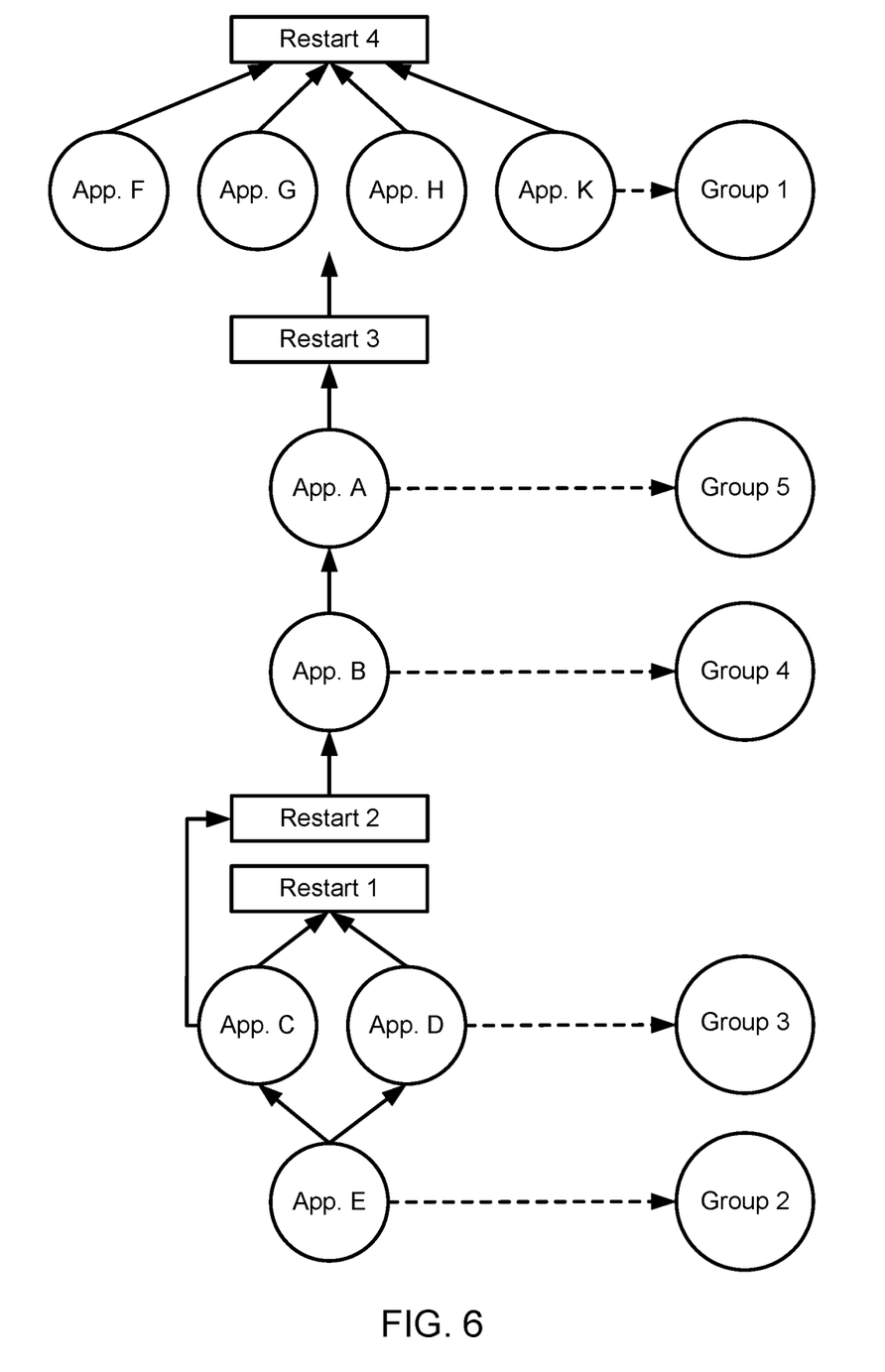
FIG. 6 shows a reordered application upgrade strategy based on user behavior in accordance with one or more embodiments of the invention.

Turning now to FIG. 6, FIG. 6 shows a reordered application upgrade strategy based on user behavior in accordance with one or more embodiments of the invention. In one or more embodiments of the invention, as discussed above in reference to FIG. 5.1, the application upgrade strategy is generated by considering the application upgrade metrics and the set of upgrade estimations. However, after determining the user's behavior (e.g., the "user behavior" discussed above), it turns out that the generated application upgrade strategy (see, e.g., FIG. 3) did not consider the most used application by the user. Thus, to reflect the user behavior into the application upgrade strategy, the application upgrade strategy is reordered as described above in reference to FIGS. 5.1 and 5.2.

Turning now to FIG. 7, FIG. 7 shows a diagram of a computing device in accordance with one or more embodiments of the invention.

In one or more embodiments of the invention, the computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), an input device(s) (710), an output device(s) (708), and numerous other elements (not shown) and functionalities. Each of these components is described below.

In one or more embodiments of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN), such as the Internet, mobile network, or any other type of network) and/or to another device, such as another computing device.

In one or more embodiments of the invention, the computing device (700) may include one or more output devices (708), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing an application upgrade, the method comprising:
    performing an emulation to generate a first application upgrade strategy for applying a plurality of application upgrades on a client device;
    determining a user behavior of a user of the client device;
    generating an application upgrade summary list using the first application upgrade strategy and the user behavior, wherein the application upgrade summary list comprises a plurality of application upgrade entries, and wherein the plurality of application upgrade entries are arranged in an order,
        wherein the order is determined by applying a term frequency-inverse document frequency method to log files associated with applications executing on the client device;
    providing the application upgrade summary list to the user of the client device; and after the providing, initiating upgrading of the client device using a second reordered application upgrade strategy generated in response to feedback from the user, wherein the second reordered application upgrade strategy is generated based on the first application upgrade strategy and the user behavior.

2. The method of claim 1, further comprising:
obtaining the log files associated with applications executing on the client device, wherein the user behavior is determined using the log files.

3. The method of claim 2, wherein the log files comprise application logs or system logs.

4. The method of claim 1, wherein generating the application upgrade summary list comprises:
generating an initial application upgrade summary list using the application upgrade strategy; and
reordering, based on the user behavior, at least a portion of the initial application upgrade summary list to obtain a reordered application upgrade summary list.

5. The method of claim 1, wherein the application upgrade summary list comprises an application identifier of an application executing on the client device, an identifier of an application upgrade for the application, and a duration of time to complete the application upgrade on the client device, wherein the application upgrade is one of the plurality of application upgrades.

6. The method of claim 1, wherein a highest ordered application upgrade entry corresponds to an application upgrade for a most used application on the client device.

7. The method of claim 1, wherein the second reordered application upgrade strategy specifies, as a highest priority upgrade, an application upgrade associated with a most used application on the client device.

8. A non-transitory computer readable medium comprising computer readable program code, which when executed by a computer processor enables the computer processor to perform a method for performing an application upgrade, the method comprising:
performing an emulation to generate a first application upgrade strategy for applying a plurality of application upgrades on a client device;
determining a user behavior of a user of the client device;
generating an application upgrade summary list using the first application upgrade strategy and the user behavior,
wherein the application upgrade summary list comprises a plurality of application upgrade entries, and wherein the plurality of application upgrade entries are arranged in an order,
wherein the order is determined by applying a term frequency-inverse document frequency method to log files associated with applications executing on the client device;
providing the application upgrade summary list to the user of the client device; and
after the providing, initiating upgrading of the client device using a second reordered application upgrade strategy generated in response to feedback from the user, wherein the second reordered application upgrade strategy is generated based on the first application upgrade strategy and the user behavior.

9. The non-transitory computer readable medium of claim 8, further comprising:
obtaining the log files associated with applications executing on the client device, wherein the user behavior is determined using the log files.

10. The non-transitory computer readable medium of claim 9, wherein the log files comprise application logs or system logs.

11. The non-transitory computer readable medium of claim 8, wherein generating the application upgrade summary list comprises:
generating an initial application upgrade summary list using the application upgrade strategy; and
reordering, based on the user behavior, at least a portion of the initial application upgrade summary list to obtain a reordered application upgrade summary list.

12. The non-transitory computer readable medium of claim 8, wherein the application upgrade summary list comprises an application identifier of an application executing on the client device, an identifier of an application upgrade for the application, and a duration of time to complete the application upgrade on the client device, wherein the application upgrade is one of the plurality of application upgrades.

13. A system for performing an application upgrade, the system comprising:
a processor comprising circuitry;
memory comprising instructions, which when executed perform a method, the method comprising:
performing an emulation to generate a first application upgrade strategy for applying a plurality of application upgrades on a client device;
determining a user behavior of a user of the client device;
generating an application upgrade summary list using the first application upgrade strategy and the user behavior,
wherein the application upgrade summary list comprises a plurality of application upgrade entries, and wherein the plurality of application upgrade entries are arranged in an order,
wherein the order is determined by applying a term frequency-inverse document frequency method to log files associated with applications executing on the client device;
providing the application upgrade summary list to the user of the client device; and
after the providing, initiating upgrading of the client device using a second reordered application upgrade strategy generated in response to feedback from the user, wherein the second reordered application upgrade strategy is generated based on the first application upgrade strategy and the user behavior.

14. The system of claim 13, wherein a highest ordered application upgrade entry corresponds to an application upgrade for a most used application on the client device.

15. The system of claim 13, wherein the second reordered application upgrade strategy specifies, as a highest priority upgrade, an application upgrade associated with a most used application on the client device.

* * * * *